United States Patent [19]

Hakansson et al.

[11] Patent Number: 5,185,307
[45] Date of Patent: Feb. 9, 1993

[54] METHOD FOR PRODUCING A CELLULAR BODY

[76] Inventors: Ulf Hakansson, van Dürens Väg 22, S-222 30 Lund; Lars Fälth, Videvägen 50, S-275 31 Sjöbo, both of Sweden

[21] Appl. No.: 741,512
[22] PCT Filed: Feb. 9, 1990
[86] PCT No.: PCT/SE90/00088
   § 371 Date: Aug. 9, 1991
   § 102(e) Date: Aug. 9, 1991
[87] PCT Pub. No.: WO90/09235
   PCT Pub. Date: Aug. 23, 1990

[30] Foreign Application Priority Data

Feb. 10, 1989 [SE] Sweden ................ 8900469

[51] Int. Cl.⁵ .................................. B01J 20/18
[52] U.S. Cl. ........................... 502/68; 502/60; 502/527
[58] Field of Search ............... 502/68, 527, 60

[56] References Cited

U.S. PATENT DOCUMENTS

| | | | |
|---|---|---|---|
| 4,420,419 | 12/1983 | Ogawa et al. | 502/68 |
| 4,608,361 | 8/1986 | Kanamori et al. | 502/527 |
| 4,886,769 | 12/1989 | Kuma et al. | 502/527 |

FOREIGN PATENT DOCUMENTS

| | | | |
|---|---|---|---|
| 25998 | 7/1972 | Japan | 502/68 |
| 105786 | 10/1974 | Japan | 502/68 |

Primary Examiner—Carl F. Dees
Attorney, Agent, or Firm—Dowell & Dowell

[57] ABSTRACT

Method of producing a cellular body for adsorption of preferably organic substances in purification plants, to which end a cellular structure is impregnated with a hydrophobic zeolite.

Impregnation takes place using a sludge of the hydrophobic zeolite and an inorganic binder, the impregnated cellular structure being heated to a temperature at which the constituents thereof begin to sinter together.

8 Claims, No Drawings

METHOD FOR PRODUCING A CELLULAR BODY

BACKGROUND OF THE INVENTION

History of the Related Art

The discharge of organic substances from industrial processes to the surroundings has become a serious environmental threat and methods for reducing such discharges have become more and more important. For a long time, it has been known that with the aid of certain sorbtion agents a considerable part of the contaminants in question can be trapped and subsequently rendered harmless or recovered.

Lately, interest has been focused on a group of inorganic substances, so-called zeolites as sorbtion agents, primarily since it has been possible to give them selectivity in sorbtion capacity with respect to the gaseous constituents in the contaminating agent, a selectivity which to a great degree excludes sorbtion of water vapor in spite of the fact that the injurious contaminants are separated with high efficiency. An example of how such a so-called hydrophobic zeolite can be built up is given in the Swedish Patent No. 8604873-3.

The hydrophobic zeolites eliminate a large problem with previously used sorbtion agents in the often recurring operational cases where the contaminating agent contains water vapour. The sorbtion capacity of the sorbtion agent has in such cases been appropriated to a large degree by the water vapor, reducing to a corresponding degree the sorbtion capacity for the injurious part of the contaminant. In turn, this has lead to lowered capacity of the sorbtion plant and furthermore to heavily increased operational costs for regenerating the sorbtion agent. The less tendency for water vapor sorbtion by the hydrophobic zeolites which could be provided, the more effective and operationally cheap the purification process has become.

An effective utilization of the sorbtion capacity of the hydrophobic zeolites requires, inter alia, that they are exposed in a fixed geometric structure in the contaminating agent, this structure permitting an intimate contact between zeolite and the flowing medium while at the same time permitting a large medium flow without a too high pressure drop. Such structures in the form of cellular bodies having alternatingly flat and pleated thin layers, which are caused to support each other at mutually separated places so that throughducts or gaps are formed have long been successfully used, e.g. for drying air.

A particularly advantageous embodiment is one where the starting material is a paper built up of sparcely layered mineral fibres, preferably glass fibres, which after building up the cellular structure are supplied with powder and binder filling out the gaps between the fibres and thereby sealing the layer simultaneously as the powder and binder combine to stiffen the layer so that it is given high mechanical strength. This cellular body is described in the Swedish Patent No. 8003175-0. Among the powders used has been the type of zeolite intended for absorbing moisture from air, and as a binder the precipitate occurring when waterglass is exposed to such as carbon dioxide or calcium chloride.

It has been apparently obvious to apply the same technique for achieving a cellular body for the hydrophobic zeolites, but in practice it has not been found possible to achieve acceptable results in this way. The binding agents which have been suggested have namely had hygroscopic properties, which is not a disadvantage when it is a question of bodies intended for the removal of moisture. In such a case, the hygroscopic capacity has even been desirable. However, when it is a question of fixing the hydrophobic zeolites in the cell structure, there is the requirement that the finished cellular body does not contain any hygroscopic components which would reduce the effect of the hydrophobic properties of the zeolites.

SUMMARY OF THE INVENTION

It is the object of this invention to form a cellular body of the kind described, where the hydrophobic zeolites are bonded in the layers with non-hygroscopic binders while the layers are given a great degree of mechanical stiffness. It is also one of the objects of the invention to provide this without the binder substantially blocking access to the pores of the zeolites for the contaminants which are to be absorbed, or affect the pore structure of the zeolite so that the hydrophobic properties are deteriorated.

In addition, it is an object to achieve a cellular body of exclusively inorganic, non-inflammable constituents so that the body can be regenerated at a high air temperature.

These objects are achieved by the cell structure in accordance with the invention being impregnated with a sludge of the hydrophobic zeolite and an inorganic binder, after which the impregnated cellular structure is heated to a temperature at which sintering between the constituents begins to occur and the cellular body is given sufficient strength.

DESCRIPTION OF THE PREFERRED EMBODIMENT

The starting material for the cellular structure is preferably layers of inorganic artificial fibres, impregnation taking place by the produced structure being doused or dipped in the sludge of zeolite and binder. For getting the desired amount of the sludge into the cellular structure, impregnation optionally takes place in several steps and the cellular body is heated between the steps for drying out water vapour.

Zeolites which have a high hydrophobic capacity, e.g. de-aluminized zeolite, are used as an active substance or adsorbent.

The inorganic binder includes clay. Particularly favorable results have been obtained with a sludge of kaolin-type clay of an alkaline nature or with alkaline additives to the sludge. In such a case, the pH value should be as high as possible without the hydrophobic properties of the zeolite being negatively affected.

As mentioned, the cellular body is impregnated with a sludge of zeolites and binder, and the mixing ratio between binder and zeolite is preferably between 0.05 and 1.00 based on dry weights, the range 0.10 to 0.35 having been found to be particularly suitable. The mixing ratio should be as low as possible, inter alia so that the binder will not block access to the pores of the zeolite, but primarily for maximizing the amount of zeolite in the cellular body.

After impregnation by the sludge, optionally in several steps with intermediate drying, the cellular body is fired at a temperature causing sintering together of the constituents in the impregnated cellular structure and preferably at a temperature at which any ability of the binder to absorb water is succesively reduced, e.g. at least 500°–600° C. During the heat treatment, the organic substances or binder which have been in the cell structure from the beginning are also fired away.

EXAMPLE

Paper made from inorganic artificial fibres is used for the production of a cellular body which is formed to a cellular structure in accordance with the method described in the introduction.

An aqueous sludge of zeolites and clay in a mixing ratio 12% zeolite, 4% clay and 84% water, giving a dry substance of 16% was used. Treatment of the cellular body was carried out by dipping twice with intermediate drying, a final firing being carried out at 600° C. This treatment gave a cellular body with a zeolite content of 60% by weight, good strength and excellent hydrophobicity.

With the aid of the described production of a cellular body by impregnation with a sludge of a hydrophobic zeolite and an inorganic binder together with heating to a temperature at which sintering takes place, there is provided a cellular body which is extremely well-suited to adsorbtion of organic substances, such as solvents from the air in industrial discharges.

The invention is naturally not limited to the described example but can be varied within the scope of the following Claims.

Accordingly, the cellular body, although it has been described for purifying gas such as air, can also be used for purifying other media such as liquids, e.g. water from contaminants of an organic nature. The binder used can also be more or less hydrophobic before heat treatment, but where possible water vapor sorbtion capacity of the binder is present, this will be reduced by the heat treatment.

We claim:

1. A method of producing a cellular body for absorption of organic substances wherein the cellular body includes spaced layers of inorganic fibers comprising the steps of:
    A. forming a sludge of a hydrophobic zeolite and an inorganic binder;
    B. Impregnating the inorganic fiber layers of the cellular body with the sludge; and
    C. Thereafter heating the cellular body to a temperature at which sintering of the impregnated fibers occurs to form a stiff porous structure.

2. The method of claim 1 in which the sludge is an aqueous sludge and including the additional step of adding an alkaline additive to the sludge.

3. The method of claim 1 in which the sludge is an aqueous sludge and wherein the inorganic binder includes a clay.

4. The method of claim 3 in which said clay is an alkaline clay.

5. The method of claim 3 in which the zeolite is mixed in the sludge in a dry weight ratio of 0.05 to 0.50 with respect to the inorganic binder.

6. The method of claim 5 in which the dry weight ratio of zeolite to inorganic binder is 0.10 to 0.35.

7. The method of any one of claims 1-6 in which the inorganic fibers are impregnated in at least two impregnation steps and wherein, after the first impregnation step, the impregnated inorganic fibers are dried.

8. The method of claim 6 in which the cellular body is sintered at temperatures between 500°-600° C.

* * * * *